US009296589B2

(12) United States Patent
Marvin

(10) Patent No.: US 9,296,589 B2
(45) Date of Patent: Mar. 29, 2016

(54) ELEVATOR REGENERATIVE DRIVE CONTROL REFERENCED TO DC BUS

(75) Inventor: Daryl J. Marvin, Farmington, CT (US)

(73) Assignee: Otis Elevator Company, Farmington, CT (US)

( * ) Notice: Subject to any disclaimer, the term of this patent is extended or adjusted under 35 U.S.C. 154(b) by 567 days.

(21) Appl. No.: 13/809,454

(22) PCT Filed: Jul. 30, 2010

(86) PCT No.: PCT/US2010/043814
§ 371 (c)(1),
(2), (4) Date: Jan. 10, 2013

(87) PCT Pub. No.: WO2012/015417
PCT Pub. Date: Feb. 2, 2012

(65) Prior Publication Data
US 2013/0112507 A1    May 9, 2013

(51) Int. Cl.
B66B 1/06    (2006.01)
B66B 1/30    (2006.01)

(52) U.S. Cl.
CPC .. *B66B 1/06* (2013.01); *B66B 1/302* (2013.01)

(58) Field of Classification Search
CPC ................................. B66B 1/06; B66B 1/302
USPC ......... 187/247, 277, 290, 293, 296, 297, 289, 187/391, 393; 318/376, 801–815; 363/47, 363/50, 132
See application file for complete search history.

(56) References Cited

U.S. PATENT DOCUMENTS

| 4,247,888 | A | * | 1/1981 | Angquist | ........................ 363/47 |
| 4,437,050 | A | | 3/1984 | Overzet | |
| 5,045,988 | A | * | 9/1991 | Gritter et al. | .................... 363/35 |
| 5,583,412 | A | * | 12/1996 | Nielsen | ......................... 318/811 |
| 5,615,102 | A | * | 3/1997 | Daijo | ............................ 363/132 |
| 5,712,456 | A | | 1/1998 | McCarthy et al. | |
| 5,764,023 | A | * | 6/1998 | Wieloch | ....................... 318/803 |
| 5,982,136 | A | * | 11/1999 | Pelly | ............................. 318/801 |
| 6,422,351 | B2 | * | 7/2002 | Tajima et al. | ................. 187/290 |
| 6,435,313 | B2 | | 8/2002 | Tajima et al. | |
| 6,439,347 | B2 | * | 8/2002 | Suga et al. | .................... 187/290 |
| 6,439,348 | B2 | | 8/2002 | Tajima et al. | |
| 6,471,013 | B2 | | 10/2002 | Banno et al. | |

(Continued)

FOREIGN PATENT DOCUMENTS

| JP | 2000217367 A | 8/2000 |
| JP | 2004304926 A | 10/2004 |

(Continued)

OTHER PUBLICATIONS

International Search Report and Written Opinion of the International Searching Authority for International application No. PCT/US2010/043814 dated Apr. 21, 2011.

(Continued)

*Primary Examiner* — Anthony Salata
(74) *Attorney, Agent, or Firm* — Carlson, Gaskey & Olds

(57) ABSTRACT

An exemplary elevator drive includes a DC bus. At least some power components in a power section are electrically referenced to the DC bus. At least some control components in a control section including a drive controller and associated inputs are electrically referenced to the DC bus. This eliminates any requirement for isolating the components referenced to the DC bus from each other.

9 Claims, 2 Drawing Sheets

(56) References Cited

U.S. PATENT DOCUMENTS

| | | | |
|---|---|---|---|
| 6,732,838 B1 | 5/2004 | Okada et al. | |
| 6,827,182 B2 * | 12/2004 | Araki | 187/290 |
| 6,850,426 B2 * | 2/2005 | Kojori et al. | 363/123 |
| 7,246,686 B2 | 7/2007 | Smith et al. | |
| 7,275,622 B2 | 10/2007 | Hall et al. | |
| 8,994,208 B2 * | 3/2015 | Huang | 307/9.1 |
| 2001/0017240 A1 | 8/2001 | Araki et al. | |
| 2002/0053490 A1 | 5/2002 | Banno et al. | |
| 2005/0068000 A1 * | 3/2005 | Yamada et al. | 318/802 |
| 2005/0224296 A1 | 10/2005 | Smith et al. | |
| 2010/0044160 A1 * | 2/2010 | Agirman et al. | 187/290 |

FOREIGN PATENT DOCUMENTS

| | | |
|---|---|---|
| JP | 200731060 | 2/2007 |
| JP | 2010105757 A | 5/2010 |

OTHER PUBLICATIONS

State Intellectual Property Office of People's Republic China First Search for Application No. 201080068358.8 dated Feb. 19, 2014.

International Preliminary Report on Patentability for International Application No. PCT/US2010/043814 dated Feb. 14, 2013.

* cited by examiner

ELEVATOR REGENERATIVE DRIVE CONTROL REFERENCED TO DC BUS

BACKGROUND

Elevator systems include a car situated in a hoistway for carrying passengers between various floors in a building, for example. A motor provides the force needed to move the elevator car. A drive causes desired operation of the motor to achieve desired elevator car movement.

An elevator system drive can be considered to have a power section and a control section. The power section, which typically includes components such as IGBTs or other switches, is sometimes electrically referenced to a DC bus. The control section, on the other hand, is electrically referenced to ground.

One issue presented by referencing the power section of a drive to the DC bus is that the DC bus is not referenced to ground. This is particularly true in regenerative drives. In that case, the DC bus potential moves significantly relative to ground with the switching of the input converter power devices. As a result, isolation is required for all control signals to the power section and all feedback signals from the power section. Example feedback signals include input and output converter current sensing, input and output converter IGBT gate commands and DC bus voltage sensing.

The isolation required between the differently electrically referenced portions of the drive introduces complexity and cost. The costs associated with isolating the control components from the power components can be a significant portion of some elevator drives.

SUMMARY

An exemplary elevator drive includes a DC bus. At least some power components in a power section are electrically referenced to the DC bus. At least some control components in a control section including a drive controller and associated inputs are electrically referenced to the DC bus. This eliminates any requirement for isolating the components referenced to the DC bus from each other.

The various features and advantages of disclosed example embodiments will become apparent to those skilled in the art from the following detailed description. The drawings that accompany the detailed description can be briefly described as follows.

DETAILED DESCRIPTION

Figure 1:
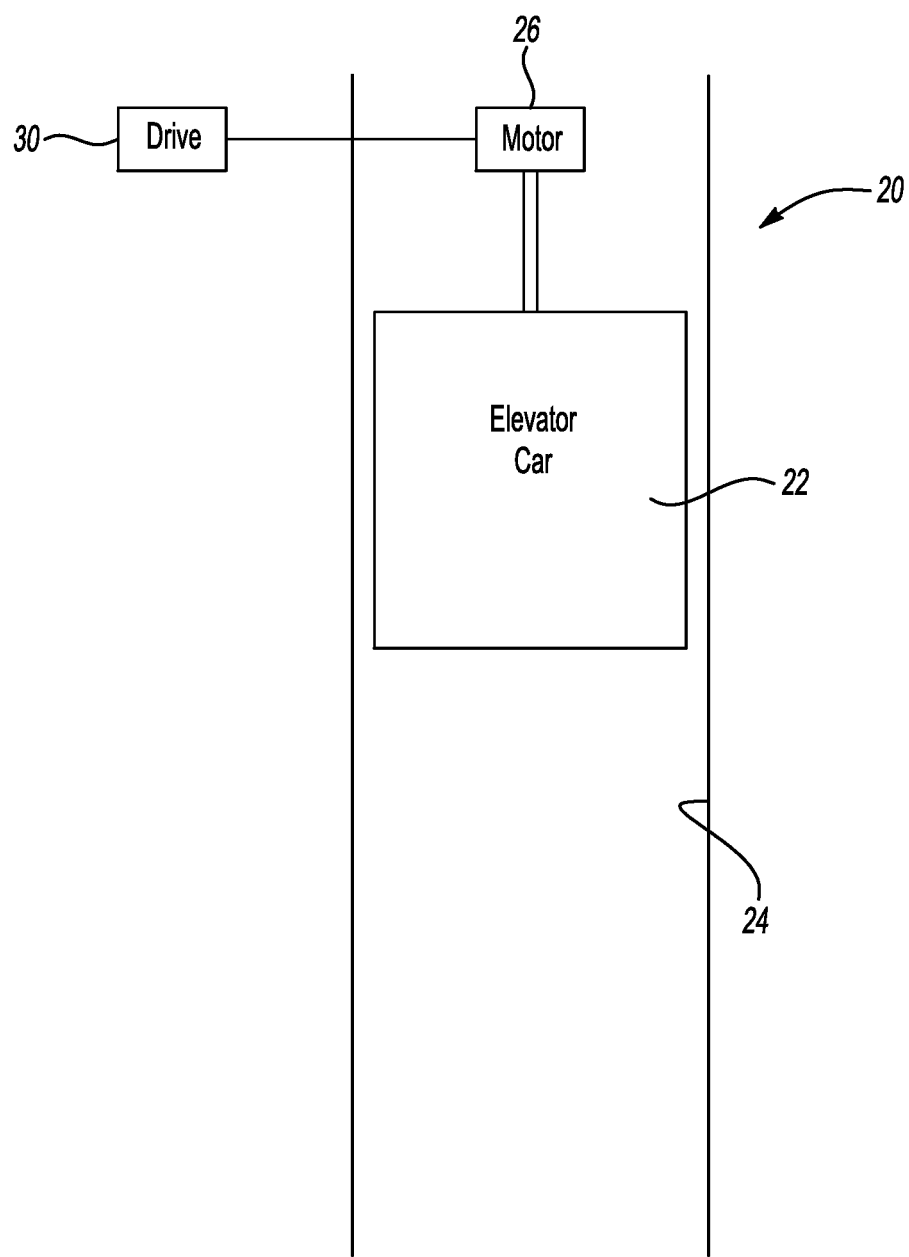
FIG. 1 schematically illustrates an elevator system designed according to an embodiment of this invention.

FIG. 1 schematically shows selected portions of an elevator system 20. An elevator car 22 is supported in a known manner within a hoistway 24. A motor 26 causes desired movement of the elevator car 22 within the hoistway 24. A drive device 30 controls operation of the motor 26. The illustrated example drive device 30 is a regenerative drive that allows for using certain operating conditions of the elevator system 20 for generating power. There are known conditions in which it is possible to use movement of the elevator system components to generate electric power rather than consuming power.

Figure 2:
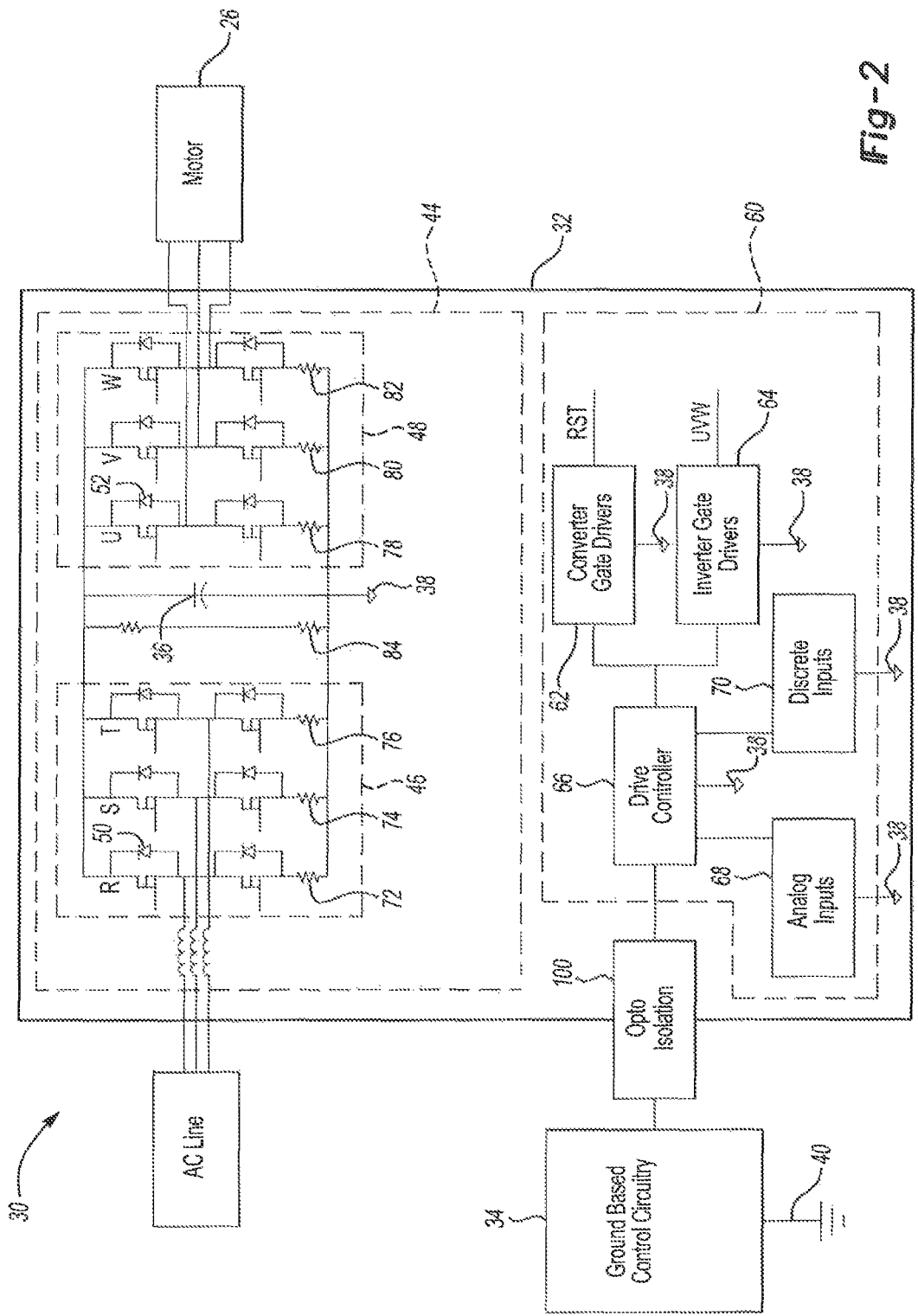
FIG. 2 schematically illustrates an elevator drive device designed according to an embodiment of this invention.

FIG. 2 schematically shows an example arrangement of the drive device 30. As schematically represented in the illustration, the drive device 30 has two portions 32 and 34. The basis for schematically distinguishing between the portions 32 and 34 is the way in which each portion is electrically referenced. The portion 32 includes the components of the drive device 30 that are electrically referenced to a DC bus 36 as schematically shown at 38. The portion 34 includes the components that are electrically referenced to ground as schematically shown at 40.

The portion 32 includes at least some of the power section of the drive device 30. In this example, components of the power section that are referenced to the DC bus are shown at 44. The components of the power section that are referenced to the DC bus include a converter 46 and an inverter 48. The converter 46 includes IGBT switches 50 and the inverter 48 includes IGBT switches 52. As shown at 38, the switches 50 and 52 are all electrically referenced to the DC bus 36.

The drive device 30 also includes a control section. In this example, the components of the control section that are referenced to the DC bus are shown at 60. Converter gate drivers 62 provide signals to control the switches 50 of the converter 46. Inverter gate drivers 64 provide signals to control the switches 52 of the inverter 48. A drive controller 66 is referenced to the DC bus 36 along with associated analog controller inputs 68 and associated discrete controller inputs 70. In one example, the drive controller 66 is a DSP based controller.

As all of the drivers 62 and 64, the drive controller 66, analog controller inputs 68 and discrete controller inputs 70 are referenced to the DC bus 36 there is no need to isolate those components from the converter 46 or the inverter 48. In previous regenerative elevator drive arrangements, the control elements such as the drive controller 66 and its associated inputs 68, 70 would have been referenced to ground and it was necessary to isolate the drivers from the switches that they control. Each drive output required its own isolating device. By eliminating a need for such isolation, the illustrated example simplifies the design of the drive device 30 and reduces the costs associated with it.

In this example, the analog inputs 68 include feedback information from the power section components at 44 that are referenced to the DC bus 36. The example analog inputs include current sensing information from the converter 46 and the inverter 48. This example includes three converter current inputs obtained from resistors 72, 74 and 76, respectively. Shunt resistors are used in one example. One feature of the illustrated example is that the ability to process current information regarding the converter currents is simplified as no special current sensors are required and no isolation is required between the current sensing components (e.g., the resistors 72, 74 and 76) and the analog inputs 68 to the controller 66.

Similarly, shunt resistors 78, 80 and 82 provide inverter current information to the discrete inputs 70 of the controller 66 without isolation. The current signal is measured relative to the DC bus.

The voltage of the DC bus 36 is available to the controller 66 from a bus voltage sensing resistor 84. Again, no special sensor components are required and there is no requirement to isolate the resistor 84 from the controller 66.

The current and voltage sensing resistors are directly coupled to the corresponding inputs 68 without any intervening components because no isolation is required between them since the control elements at 60 are electrically referenced to the DC bus. Simplifying the ability to sense current and voltage and eliminating a requirement for corresponding isolation reduces the complexity of the drive device 30 and further reduces its cost.

Some of the control section components are included in the portion 34. Those control section components are electrically referenced to ground. Some communication between the control section components 60 and the control section components in the portion 34 is required. This example provides isolation between such components because the drive device 30 is a regenerative drive. With a regenerative drive the DC bus voltage varies significantly in relation to ground because of the switching in the converter 46. For example, the DC bus in the regenerative drive device 30 may switch +/−0.5*Vbus at the pulse width modulation frequency used to control the switching. This change occurs with very fast (i.e., high frequency) edges due to the switching.

Non-regenerative drives do not have the same challenges associated with referencing components to the DC bus. In non-regenerative drives the DC bus voltage varies relatively slowly in relation to ground. The main varying element in non-regenerative drives is typically at six times the electrical frequency with relatively small amplitude. The drive device 30 is a regenerative drive, however, so the illustrated example includes isolation between the ground-referenced control section components and those that are referenced to the DC bus 36.

The illustrated example includes optical isolation at an interface 100. This example includes relatively simple opto-isolation that provides sufficient isolation between the control section 34 referenced to ground at 40 on the one hand and control section components 60 that are referenced to the DC bus at 38 on the other hand.

One way in which the illustrated example provides cost savings over previous regenerative elevator drive arrangements is in the elimination of isolation between at least some of the control section components 60 and at least some of the power section components 44. For example, without the disclosed arrangement, every driver output to a switch of the converter 46 and inverter 48 would have required a separate isolator. The disclosed example eliminates such isolators. Other isolators are also eliminated as can be appreciated from the above description and FIG. 2. Eliminating those isolators also allows for making the drive device 30 smaller. Further cost savings are realized through the use of shunt resistors for current sensing without any associated isolation.

The preceding description is exemplary rather than limiting in nature. Variations and modifications to the disclosed examples may become apparent to those skilled in the art that do not necessarily depart from the essence of this invention.

The scope of legal protection given to this invention can only be determined by studying the following claims.

I claim:

1. A regenerative elevator drive device, comprising:
   a DC bus;
   a power section having a plurality of power components electrically referenced to the DC bus; and
   a control section having a plurality of control components including a drive controller and controller inputs electrically referenced to the DC bus,
   wherein at least one of the controller inputs is coupled to a current sensing resistor in the power section so that the controller can determine a current of a corresponding component of the power section.

2. The device of claim 1, wherein the power components electrically referenced to the DC bus comprise a converter and an inverter and the control components electrically referenced to the DC bus comprise converter drivers and inverter drivers that are controlled by the drive controller, the converter drivers and inverter drivers providing control signals to the converter and the inverter, respectively.

3. The device of claim 2, wherein the converter and the inverter each comprise a plurality of control switches referenced to the DC bus.

4. The device of claim 2, wherein the control components that are referenced to the DC bus comprise converter gate drivers and inverter gate drivers.

5. The device of claim 1, wherein the controller inputs comprise a plurality of analog inputs and a plurality of discrete inputs.

6. The device of claim 1, wherein at least some of the controller inputs are from one of the components of the power section that is referenced to the DC bus.

7. The device of claim 1, wherein at least one of the controller inputs is coupled to a voltage sensing resistor associated with the DC bus so that the controller can determine a voltage of the DC bus.

8. The device of claim 1, wherein other components of the control section are electrically referenced to ground and comprising optical isolators between some of the control section components that are referenced to ground and some of the components of the control section that are referenced to the DC bus.

9. The device of claim 1, comprising a plurality of shunt resistors associated with selected ones of the components of the power section, the shunt resistors providing current information to at least one of the components of the control section.

* * * * *